(12) United States Patent
Yang et al.

(10) Patent No.: US 9,766,402 B2
(45) Date of Patent: Sep. 19, 2017

(54) TUNABLE ADD-DROP FILTER WITH AN ACTIVE RESONATOR

(71) Applicant: Washington University, St. Louis, MO (US)

(72) Inventors: Lan Yang, St. Louis, MO (US); Sahin Kaya Ozdemir, St. Louis, MO (US); Faraz Monifi, St. Louis, MO (US)

(73) Assignee: Washington University, St. Louis, MO (US)

( * ) Notice: Subject to any disclaimer, the term of this patent is extended or adjusted under 35 U.S.C. 154(b) by 0 days.

(21) Appl. No.: 14/897,863

(22) PCT Filed: Jun. 11, 2014

(86) PCT No.: PCT/US2014/041877
§ 371 (c)(1),
(2) Date: Dec. 11, 2015

(87) PCT Pub. No.: WO2015/050591
PCT Pub. Date: Apr. 9, 2015

(65) Prior Publication Data
US 2016/0131844 A1   May 12, 2016

Related U.S. Application Data

(60) Provisional application No. 61/834,113, filed on Jun. 12, 2013.

(51) Int. Cl.
*G02B 6/293* (2006.01)
*G02B 6/12* (2006.01)
(Continued)

(52) U.S. Cl.
CPC ..... *G02B 6/29338* (2013.01); *G02B 6/12007* (2013.01); *G02B 6/29383* (2013.01);
(Continued)

(58) Field of Classification Search
CPC ............ G02B 6/29335; G02B 6/29338; G02B 6/29341; G02B 6/29343; G02B 6/29383; G02B 6/29395
See application file for complete search history.

(56) References Cited

U.S. PATENT DOCUMENTS 6,052,495 A * 4/2000 Little ...................... G02F 1/011
                                                        385/2
6,580,851 B1 * 6/2003 Vahala ............... G02B 6/12007
                                                       385/15
(Continued)

FOREIGN PATENT DOCUMENTS

WO    2004062053 A2    7/2004
WO    2004070432       8/2004

OTHER PUBLICATIONS

Monifi et al.; "A Robust and Tunable Add-Drop Filter Using Whispering Gallery Mode Microtoroid Resonator"; Journal of Lightwave Technology, vol. 30, No. 21; Nov. 1, 2012; pp. 3306-3315.*

(Continued)

*Primary Examiner* — Daniel Petrovsek
(74) *Attorney, Agent, or Firm* — Armstrong Teasdale LLP

(57) ABSTRACT

An add-drop filter for transmitting at least one signal is provided. The add-drop filter includes at least two optical waveguides capable of carrying the at least one signal, and at least one active resonator coupled between the optical waveguides, wherein the at least one active resonator provides gain that counteracts losses for the at least one signal.

20 Claims, 5 Drawing Sheets

(51) Int. Cl.
*H01S 3/16* (2006.01)
*H01S 3/06* (2006.01)
*H01S 3/17* (2006.01)

(52) U.S. Cl.
CPC ........ *G02B 6/29395* (2013.01); *H01S 3/1608* (2013.01); *H01S 3/0627* (2013.01); *H01S 3/1618* (2013.01); *H01S 3/176* (2013.01)

(56) References Cited

U.S. PATENT DOCUMENTS

| | | | |
|---|---|---|---|
| 6,668,006 B1* | 12/2003 | Margalit | G02B 6/12007 372/92 |
| 6,751,377 B2* | 6/2004 | Baumann | G02B 6/12007 385/15 |
| 6,871,025 B2 | 3/2005 | Maleki et al. | |
| 6,891,997 B2 | 5/2005 | Sercel et al. | |
| 6,987,914 B2 | 1/2006 | Savchenkov et al. | |
| 7,092,591 B2 | 8/2006 | Savchenkov et al. | |
| 7,236,664 B2 | 6/2007 | Martin et al. | |
| 7,260,279 B2 | 8/2007 | Gunn et al. | |
| 7,292,751 B2* | 11/2007 | Popovic | G02B 6/12007 359/247 |
| 7,460,746 B2 | 12/2008 | Maleki et al. | |
| 7,480,425 B2 | 1/2009 | Gunn et al. | |
| 7,545,843 B2* | 6/2009 | Armani | G02B 6/12007 372/19 |
| 7,769,071 B2 | 8/2010 | Vahala et al. | |
| 7,783,144 B2* | 8/2010 | Chigrinov | G02B 6/12007 385/15 |
| 7,796,262 B1* | 9/2010 | Wang | G01N 21/7746 356/436 |
| 8,208,502 B2 | 6/2012 | Srinivasan et al. | |
| 8,483,521 B2* | 7/2013 | Popovic | G02B 6/29338 385/15 |
| 8,704,155 B2* | 4/2014 | He | G01N 21/7746 250/227.18 |
| 2004/0008942 A1* | 1/2004 | Scheuer | G02B 6/12007 385/39 |
| 2004/0247008 A1* | 12/2004 | Scheuer | B82Y 20/00 372/94 |
| 2005/0163185 A1 | 7/2005 | Vahala et al. | |
| 2010/0231903 A1 | 9/2010 | Sumetsky | |
| 2011/0139970 A1 | 6/2011 | He et al. | |
| 2012/0268731 A1 | 10/2012 | Zhu et al. | |
| 2012/0321245 A1 | 12/2012 | Vahala et al. | |
| 2014/0321485 A1* | 10/2014 | Seidel | H01S 5/065 372/19 |

OTHER PUBLICATIONS

Yang, Fabrication and characterization of microlasers by the sol-gel method. Diss. California Institute of Technology, 2005.

Monifi et al., A robust and tunable add-drop filter using whispering gallery mode microtoroid resonator. Lightwave technology. vol. 30, issue: 21, Dec. 10, 2012.

Cai, et al. "Highly efficient optical power transfer to whispering-gallery modes by use of a symmetrical dual-coupling configuration." Optics Letters 25.4 (2000): 260-262.

Yao, et al. "Bandwidth-tunable add-drop filters based on micro-electro-mechanical-system actuated silicon microtoroidal resonators." Optics letters 34.17 (2009): 2557-2559.

Rokhsari, et al "Ultralow loss, high Q, four port resonant couplers for quantum optics and photonics." Physical review letters 92.25 (2004): 253905.

Monifi, et al. "Encapsulation of a microtoroid resonator side-coupled to a fiber taper into a polymer matrix." Photonics Conference (IPC), 2012 IEEE. IEEE, 2012.

* cited by examiner

TUNABLE ADD-DROP FILTER WITH AN ACTIVE RESONATOR

CROSS-REFERENCE TO RELATED APPLICATION

This application is a U.S. National Phase Application of International Application PCT Application No. PCT/US2014/041877 filed on Jun. 11, 2014; said application claims the benefit of U.S. Provisional Application No. 61/834,113 filed Jun. 12, 2013. The disclosures of International Application PCT Application No. PCT/US2014/041877 and U.S. Provisional Application No. 61/834,113 are incorporated herein by reference.

GOVERNMENT INTEREST

This invention was made with government support under Grant No. W911NF-12-1-0026 awarded by the U.S. Army Research Office. The government may have certain rights in the invention.

BACKGROUND

The field of the invention relates generally to optical add-drop filters (ADF), and more particularly to add-drop filters including at least one active resonator that provides gain.

Optical add-drop filters (ADFs) have been utilized in applications ranging from optical communication (e.g., modulators, multiplexers, and switches) to optical sensing. These devices typically include two waveguides and a filter. For communication applications, it is important that ADFs have high add-drop efficiencies, low crosstalk, filter tenability to select different wavelengths to add and/or drop, and even different bandwidths. In at least some known systems, Bragg gratings, photonic crystal structures, and whispering gallery mode (WGM) ring resonators have been used as filter components in ADFs. With their micro-scale size, ultra-high quality (Q) factor (which translates into narrow bandwidth), and large free spectral range, WGM resonators have emerged as a relatively attractive candidate for ADFs. However, in addition to fabrication challenges, two problems encountered by at least some known ADFs including WGM resonators are the non-unitary add-drop efficiencies and differences in the efficiencies and crosstalks of the add and drop channels.

Accordingly, current technologies may suffer from significant crosstalk and low drop efficiency, resulting in relatively high losses. Furthermore, at least some known ADFs are not optically tunable. Rather, in at least some known ADFs, bandwidth and frequency tuning may be performed by varying a refractive index of a polymer coating of the WGM resonator, or by directly heating the resonator.

BRIEF DESCRIPTION

In one embodiment, an add-drop filter for transmitting at least one signal is provided. The add-drop filter includes at least two optical waveguides capable of carrying the at least one signal, and at least one active resonator coupled between the optical waveguides, wherein the at least one active resonator provides gain that counteracts losses for the at least one signal.

In another embodiment, an optical communication system is provided. The optical communication system includes an add-drop filter for transmitting at least one signal, the add-drop filter including at least two optical waveguides capable of carrying the at least one signal, and at least one active resonator coupled between the optical waveguides, wherein the at least one active resonator provides gain that counteracts losses for the at least one signal. The optical communication system further includes a gain stimulation device coupled to the add-drop filter, the gain stimulation device configured to provide a gain stimulation signal that excites a gain medium of the at least one active resonator.

In yet another embodiment, a method of transmitting at least one signal through an add-drop filter is provided. The method includes directing the at least one signal into the add-drop filter, wherein the add-drop filter includes at least two optical waveguides, and at least one active resonator coupled between the optical waveguides, and providing, using the at least one active resonator, gain that counteracts losses for the at least one signal as the at least one signal is transmitted through the add-drop filter.

BRIEF DESCRIPTION OF THE DRAWINGS

The embodiments described herein may be better understood by referring to the following description in conjunction with the accompanying drawings.

DETAILED DESCRIPTION OF THE DRAWINGS

Figure 1:
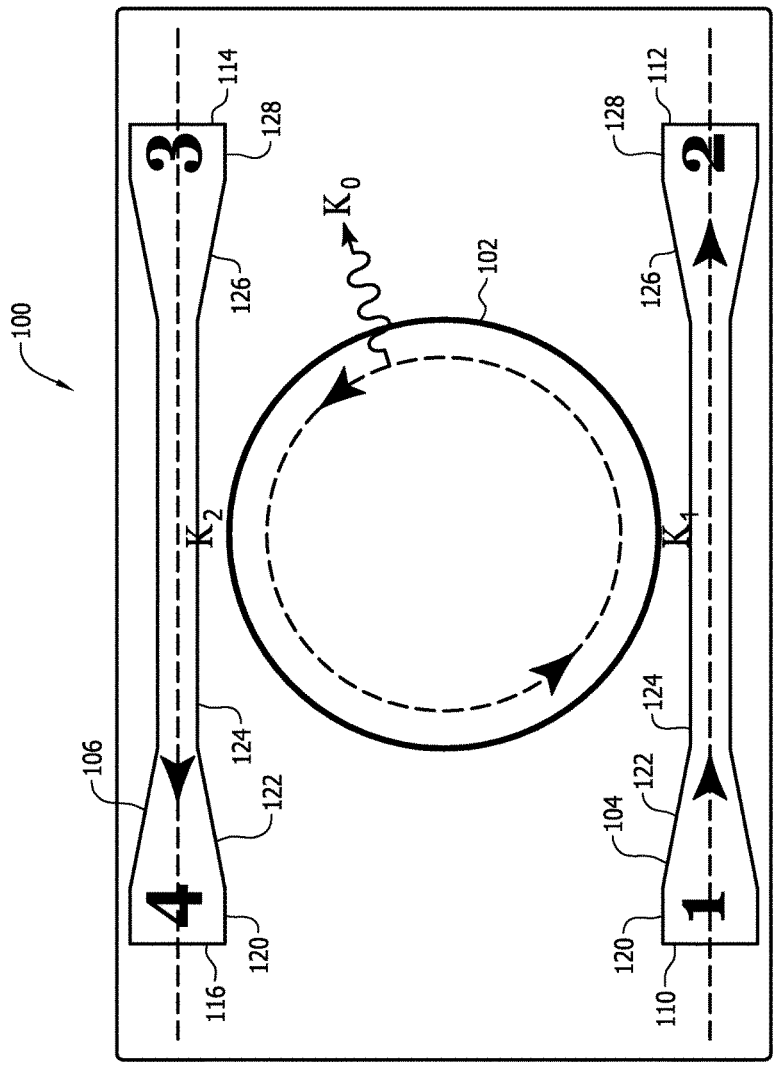
FIG. 1 is a schematic diagram of an exemplary active add-drop filter (ADF).
Figure 2:
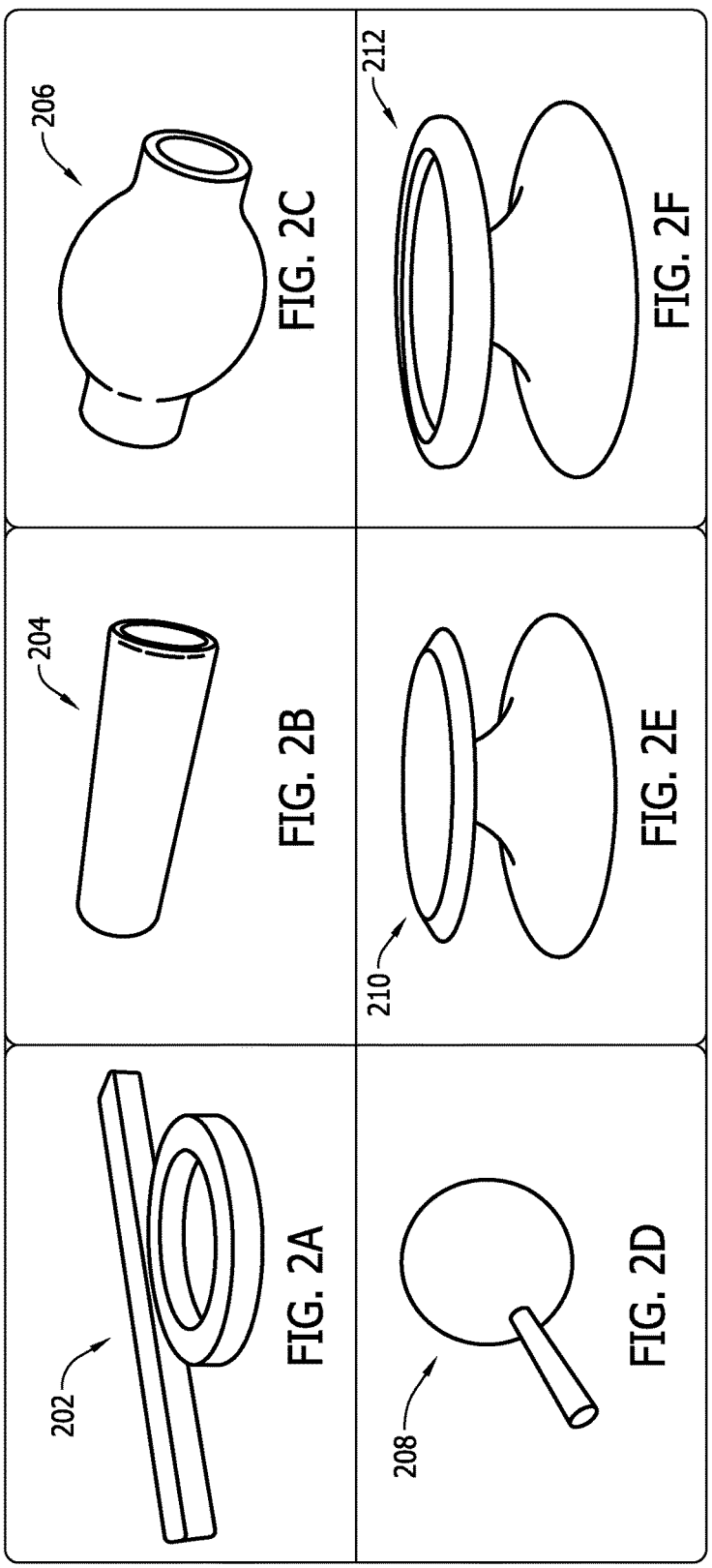
FIGS. 2A-2F are perspective views of exemplary resonators that may be used with the ADF shown in FIG. 1.

The systems and methods described herein are directed to an add-drop filter (ADF) that includes an active resonator (e.g., a whispering-gallery-mode (WGM) resonator). In one suitable embodiment, the WGM resonator includes an optically active gain medium such that it is an active resonator. Accordingly, the systems and methods described herein provide an optically controllable ADF. That is, by introducing an optically active gain medium in a WGM resonator, the features and performance of an ADF including the WGM resonator may be optically controlled.

Modern optical communication systems and networks generally require state-of-the-art ADFs, narrowband optical filters, optical routers, and optical modulators. At least some known optical filters suffer from relatively poor linewidths of resonances, as this is limited by an absorption loss of the material used for the filter. To compensate such losses, photons may be provided from a gain medium into the same resonance line of interest. An active resonator with its incorporated optically active gain medium will have resonance lines much narrower than what is achievable with passive resonators (i.e., resonators without an optically active gain medium). At least some known ADFs suffer the same problem that optical filters suffer. Thus, an ADF with active gain medium will have an improved resolution, allowing adding and/or dropping of signals whose wavelengths are spaced relatively closed.

Passive ADFs fabricated using a WGM resonator have add and drop efficiencies smaller than one, due to non-zero intrinsic losses of the resonator and different coupling losses between the resonator and fiber taper waveguides. However, as described herein, introducing gain into a WGM resonator and optically pumping the gain below the lasing threshold not only allows loss compensation to achieve add and drop efficiencies higher than with a passive ADF, but also reduces crosstalk and improves tunability. For example, according to at least some embodiments, an active ADF fabricated using an erbium-ytterbium co-doped microsphere may achieve 100-fold enhancement in the intrinsic quality factor, 3.5 fold increase in drop efficiency, bandwidth tunability of 35 MHz, and a crosstalk of only 2%. In other embodiments, other dopants with similar properties for providing optical gain may be used. Also, in at least some other embodiments, the WGM resonator may be any other WGM resonator, such as a micro-toroid, micro-ring, micro-bubble, or micro-bottle. By providing gain, the systems and methods described herein facilitate achieving a ratio of add and drop efficiencies very close to one, and those efficiencies are higher than those of passive ADFs.

In some embodiments, resonances are provided in both the optical pump band (980 nm) and the emission band (1550 nm—telecommunication band). In one embodiment, when the gain medium is pumped in the 980 nm band (e.g., using an optical pump), emission from the erbium ions into the 1550 nm band compensates a portion of the losses in the system, facilitating resonances with narrower linewidths. The narrower linewidths may be shown by comparing the linewidths of the resonances with and without an optical pump (i.e., when pump is inactive, the ADF works like conventional passive ADF). Accordingly, the active ADF has a much a narrower linewidth than the passive filter, enabling dropping and/or adding signals with wavelengths (or frequencies) very close to each other.

At least some known ADFs have different add and drop efficiencies. Ideally, the add and drop efficiencies are equal to each other. However, this is possible only when losses are completely compensated for. The better the compensation, the closer the add and drop efficiencies. Active ADFs, such as those described herein, address this issue as well.

More specifically, by increasing an optical pump power, the linewidth gets narrower as the losses are compensated more and more. Sufficiently increasing the pump power brings the effective loss relatively close to zero, such that an add-drop efficiency ratio approaches unity. Accordingly, in the embodiments described herein, the add and drop efficiencies are relatively close to each other.

Active ADFs in accordance with the embodiments described herein also demonstrate a reduction in the crosstalk between different ports as compared with passive ADFs. As such, the active ADFs described herein provide reduced crosstalk, similar values of add and drop efficiencies, higher add-drop efficiencies, and more precise tunable bandwidth as compared to passive ADFs. Further, in some embodiments, the drop and add wavelengths in active ADFs with gain medium can be tuned optically. In other embodiments, thermal tuning may be used to tune the add and drop wavelengths.

In some embodiments, an ADF fabricated using a WGM micro-resonator with a doped optically active medium provides higher add and drop efficiencies, reduces crosstalk, helps to obtain similar efficiencies for adding and dropping (i.e., the ratio of add and drop efficiencies approach unity), enables dropping and/or adding signals with smaller wavelength separations, and provides bandwidth tunability. Some of these are performance improvements over ADFs with passive WGM resonators, and others are possible only in an active ADF utilizing an active WGM resonator. Thus, active ADFs are significant tools for use in present and future optical communication networks.

As described herein, in some embodiments, an ADF is provided in which an erbium-ytterbium ($Er^{3+}$-$Yb^{3+}$) co-doped microsphere resonator is side-coupled to a pair of tapered fibers. In such ADFs, the optical gain provided by $Er^{3+}$ ions helps to compensate losses in the resonator, therefore enabling a tunable add-drop bandwidth, efficiency and crosstalk. Further, in this co-doped active resonator, $Yb^{3+}$ ions are doped to improve the efficiency of the optical pumping of $Er^{3+}$ ions, and tunability occurs from the ability to tune the optical gain by increasing or decreasing a pump power. Different rare-earth ions can be doped singly or co-doped multiply in any concentration to provide gain at the spectral band of choice or to cover gain in many different bands. Further, as described herein, techniques other than ion doping may be utilized to provide active gain in an ADF.

FIG. 1 is a schematic diagram of an active ADF 100 according to one embodiment. ADF 100 includes a resonator 102 optically coupled to a first optical waveguide 104 and a second optical waveguide 106. In this embodiment, resonator 102 is a microsphere, and first and second optical waveguides 104 and 106 are tapered optical fibers. Alternatively, resonator 102 and first and second optical waveguides 104 and 106 may be any optical components that enable ADF 100 to function as described herein. For example, in some embodiments, first and second optical waveguides 104 and 106 are planar waveguides that perform equivalently to an actual optical fiber. Further, resonator 102 is not limited to WGM resonators. That is, gain-induced performance enhancement, as described herein, can be realized in ADFs built using any suitable filter or resonator. For example, photonic crystal cavities suffer from losses that may be compensated by introducing active gain.

ADF 100 includes an input port 110, a through port 112, an add port 114, and a drop port 116. In operation, one or more optical signals enter ADF 100 through input port 110 and exit ADF 100 at through port 112. Further, one or more optical signals may be added through add port 114 or dropped through drop port 116.

As noted, first and second optical waveguides 104 and 106 are tapered optical fibers in this embodiment. Each of first and second optical waveguides 104 and 106 includes a first normal portion 120, a first tapered portion 122, a narrow portion 124, a second tapered portion 126, and a second normal portion 128. In first normal portion 120 and second normal portion 128, the tapered optical fiber has a first diameter. In narrow portion 124, the tapered optical fiber has a second diameter smaller than the first diameter. In the exemplary embodiment, each tapered optical fiber has a length of approximately 10 millimeters (mm), and the diameter of narrow portion 124 is approximately 0.8 micrometers (μm). Alternatively, the tapered optical fibers may have any dimensions and/or characteristics that enable ADF 100 to function as described herein.

In the exemplary embodiment, each tapered optical fiber is prepared from a standard communication single-mode fiber having a core radius of approximately 4 μm and a cladding radius of approximately 62.5 μm. The standard communication single-mode fiber is heated and pulled above a hydrogen flame to generate the tapered optical fibers. Alternatively, the tapered optical fibers may be prepared using any methods and/or components that enable ADF 100 to function as described herein.

As will be understood by those of skill in the art, first and second optical waveguides 104 and 106 are optically coupled to resonator 102 at narrow portions 124. More specifically, as optical signals pass through first tapered portion 122, the light spreads out into the surrounding area. Accordingly, narrow portion 124 allows optical signals to couple into and out of resonator 102.

As shown in FIG. 1, $\kappa_1$ denotes coupling losses between first optical waveguide 104 and resonator 102, $\kappa_2$ denotes coupling losses between second optical waveguide 106 and resonator 102, and $\kappa_0$ denotes an intrinsic energy decay rate of resonator 102. The intrinsic energy decay rate will be reduced by any optical gain $\xi$ provided by ADF 100. Specifically, at resonance, the transmission and drop efficiency of ADF 100 are given by Equations 1 and 2, respectively:

$$T = \frac{(\kappa_0 - \xi - \kappa_1 + \kappa_2)^2}{(\kappa_0 - \xi + \kappa_1 + \kappa_2)^2} \quad \text{Equation 1}$$

$$D = \frac{4\kappa_1 \kappa_2}{(\kappa_0 - \xi + \kappa_1 + \kappa_2)^2} \quad \text{Equation 2}$$

To avoid crosstalk, the transmission should be zero at resonance in both adding and dropping conditions. This can be satisfied for add and drop channels simultaneously only when the intrinsic loss of the cavity $\kappa_0$ is zero, which is relatively difficult to achieve, due to the fact that the material or resonator 102 has a non-zero absorption loss. However, Equation 2 suggests that in order to increase the drop efficiency, the intrinsic losses should be decreased. To achieve this, optical gain can be utilized to compensate for the losses (ideally with $\xi$ substantially equal to $\kappa_0$). Then, by tuning the loss and gain in ADF 100, one can decrease resonance linewidths, increase drop efficiency, and substantially eliminate the crosstalk.

As noted, in this embodiment, resonator 102 is a microsphere. More specifically, resonator 102 may be, for example, a 80 μm diameter silica microsphere fabricated by reflowing the end of a fiber tip with a high power CO2 laser. Alternatively, resonator 102 may be fabricated using any process that enables ADF 100 to function as described herein. For example, in some embodiments, resonator 102 may be fabricated using a semiconductor material.

In this embodiment, gain is provided in ADF 100 by introducing a gain medium to resonator 102 and using a pump laser (not shown in FIG. 1) to excite the gain medium. In order to introduce the gain medium, in this embodiment, the silica microsphere is dip-coated with a layer of $Er^{3+}$-$Yb^{3+}$ co-doped sol-gel silica. In other embodiments, resonator 102 may be any suitable WGM resonator, and resonator 102 may be doped using other ion doping methods. For example, the resonator 102 may be doped using at least one of an ion implantation method in which ions are implanted into the material, a dip-coating method in which resonator 102 is dipped one or more times into and coated with a sol-gel material having the gain dopants, and/or a direct fabrication method wherein resonator 102 is fabricated from a sol-gel material already doped with the gain medium.

During operation of ADF 100, first and second optical waveguides 104 and 106 and resonator 102 are substantially fixed relative to each other. For example, in some embodiments, first and second optical waveguides 104 and 106 are mounted to a supporting material (not shown), such as, for example, a glass base. Further, although first and second optical waveguides 104 and 106 are shown as substantially straight in FIG. 1, first and second optical waveguides 104 and 106 may alternatively be curved, u-shaped, and/or fixed in any shape that enables ADF 100 to function as described herein.

In one embodiment, ADF 100 is assembled as follows. Using a nanopositioning system, resonator 102 is placed between first and second optical waveguides 104 and 106 such that one of first and second optical waveguides 104 and 106 is very close to the resonator 102. Then, the other of first and second optical waveguides 104 and 106 is pushed close to resonator 102 using a fiber tip placed on a positioning stage. In some embodiments, once resonator 102 and first and second optical waveguides 104 and 106 are properly positioned, the components of ADF 100 are secured (i.e., by encasing the components in a thermoplastic material) such that ADF 100 forms a packaged device. That is, ADF 100 may be packaged as a "black-box" component that leaves ports 110, 112, 114, and 116 exposed, but encloses and protects first and second optical waveguides 104 and 106 and resonator 102. Further, one or more components of ADF 100 may be fabricated using optical lithography and/or semiconductor processes.

FIGS. 2A-2F are perspective views of exemplary WGM resonators that may be used with ADF 100. For example, a ring resonator 202 (shown in FIG. 2A), a capillary resonator 204 (shown in FIG. 2B), a bubble resonator 206 (shown in FIG. 2C), a microsphere resonator 208 (shown in FIG. 2D), a disk resonator 210 (shown in FIG. 2E), and/or a microtoroid resonator 212 (shown in FIG. 2F) may be used in ADF 100. Alternatively, other types of WGM resonators maybe utilized.

Figure 3:
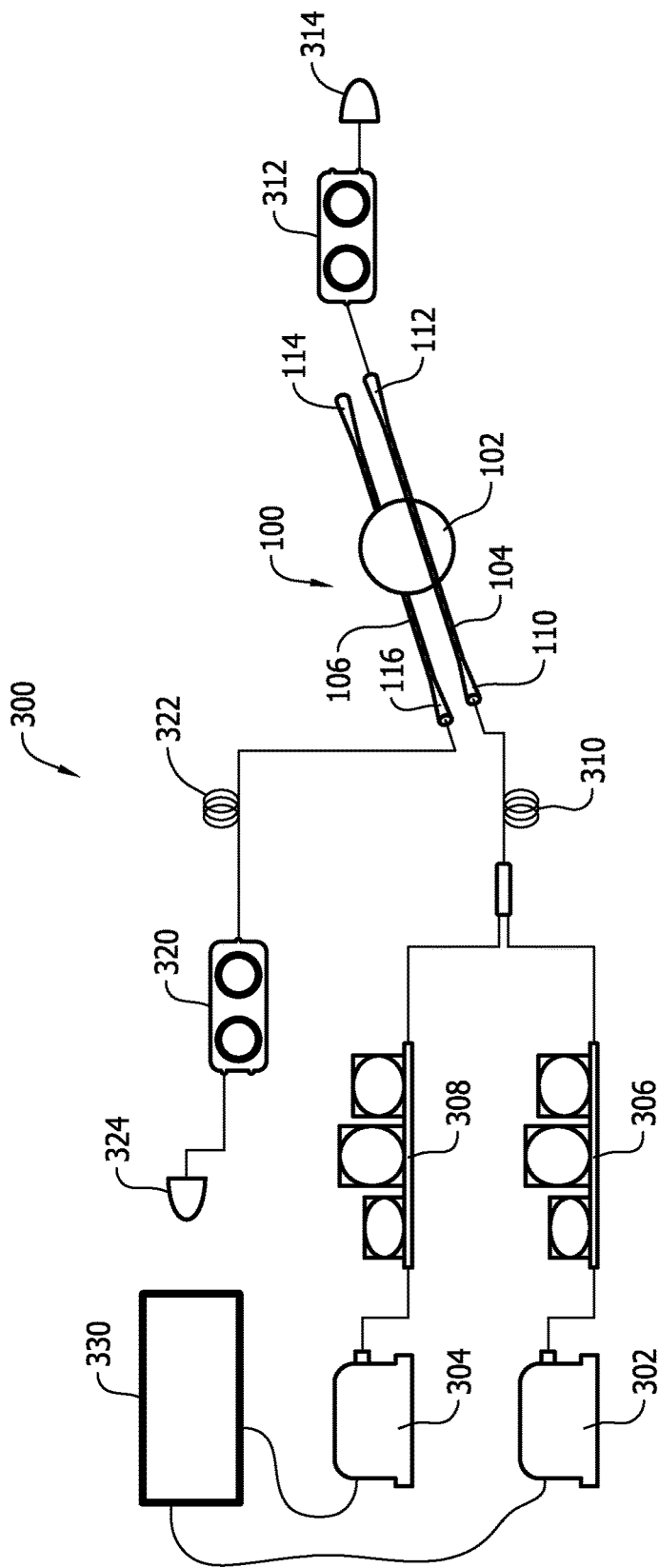
FIG. 3 is a schematic diagram of an exemplary optical communication system that includes the ADF shown in FIG. 1.

FIG. 3 is a schematic diagram of an optical communication system 300 that includes ADF 100. System 300 includes a pump laser 302 that generates light (also referred to as a gain stimulation signal) to excite the gain medium, and a probe laser 304 that emits at least one optical signal (i.e., light) to be transmitted through ADF 100. The light emitted by pump laser 302 and the light emitted by probe laser 304 pass through respective polarization controllers 306 and 308 and are combined before passing through a first fiber spool 310 and entering ADF 100 at input port 110.

Through port 112 is coupled to a first filter 312, which is in turn coupled to a first photodetector 314. First photodetector 314 measures a power of the optical signal transmitted through first filter 312 and the detected power may be output to a computing device (not shown) for further processing. In this embodiment, drop port 116 is coupled to a second filter 320 through a second fiber spool 322. Further, second filter 320 is coupled to a second photodetector 324. Second photodetector 324 measures a power of the optical signal transmitted through first filter 320 and the detected power may be output to a computing device (not shown) for further processing. In this embodiment, first and second filters 312 and 320 are 980 nm to 1550 nm wavelength-division multiplexing filters. Alternatively, first and second filters 312 and 320 may be any filters that enable system 300 to function as described herein.

In this embodiment, a controller 330 is communicatively coupled to pump laser 302 and probe laser 304. Controller 330 enables a user to control pump laser 302 and probe laser 304 (e.g., to optically tune pump laser 302 and control optical signals emitted by probe laser 304). Controller 330 may be a computing device or any other hardware component that enables the user to control pump laser 302 and probe laser 304.

In this embodiment, pump laser 302 emits light in the 980 nm band, and probe laser 304 emits light in the 1550 nm band. Alternatively, pump laser 302 and probe laser may emit light in any bandwidths that enables system 300 to function as described herein. When pumping at around 980 nm, the Erbium ions in resonator 102 emit light at 1550 nm. This light compensates for a portion of the losses of ADF 100. The Ytterbium, if present, acts as a sensitizer.

Figure 4:
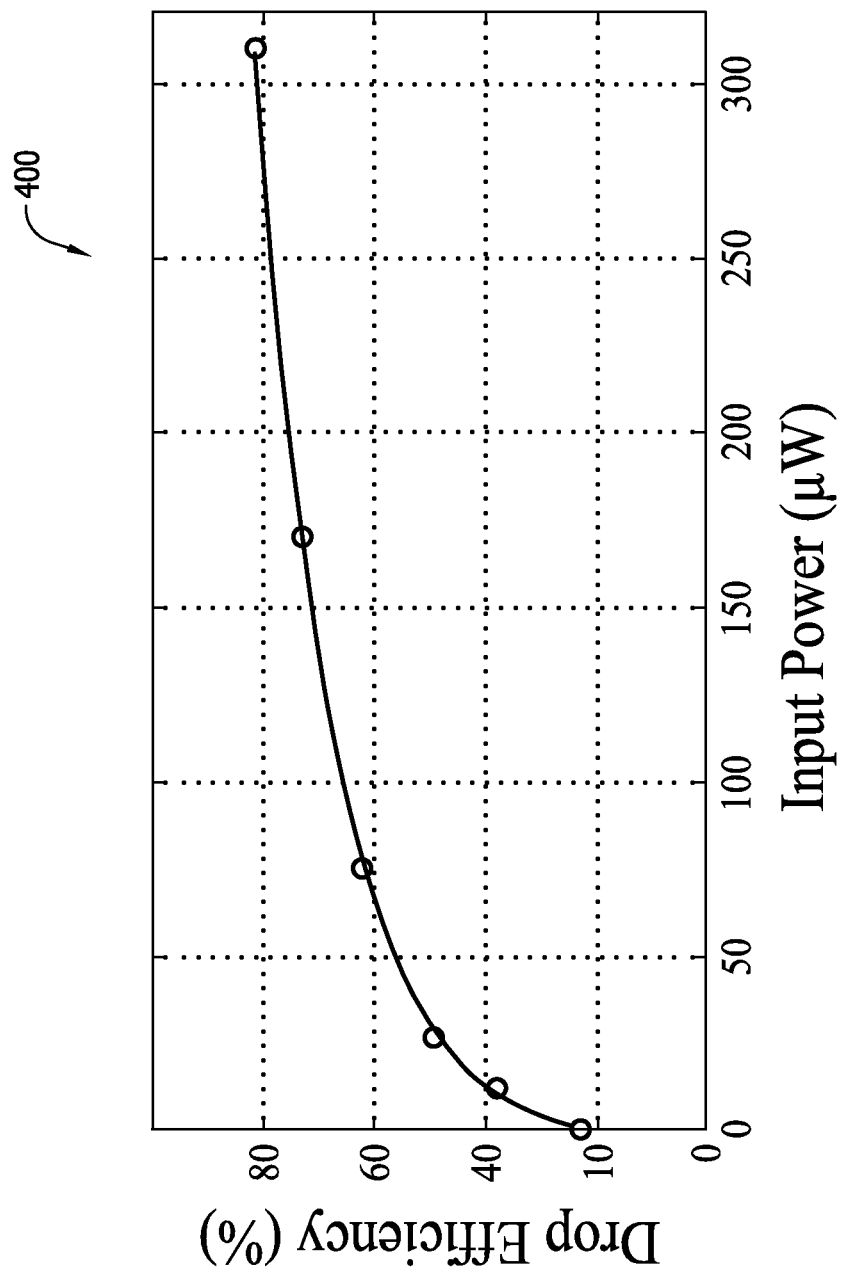
FIG. 4 is a graph plotting experimental data of drop efficiency versus pump power of an optical gain stimulation device.

By changing a power of the signal from pump laser 302, the level of compensation, and thus the performance of ADF 100, can be varied. For example, as shown in graph 400 FIG. 4, as an input power of pump laser 302 increases, the drop efficiency of ADF 100 (see Equation 2) increases. Accordingly, adjusting the pump power (e.g., using controller 330) facilitates selectively tuning the performance characteristics of ADF 100.

Figure 5:
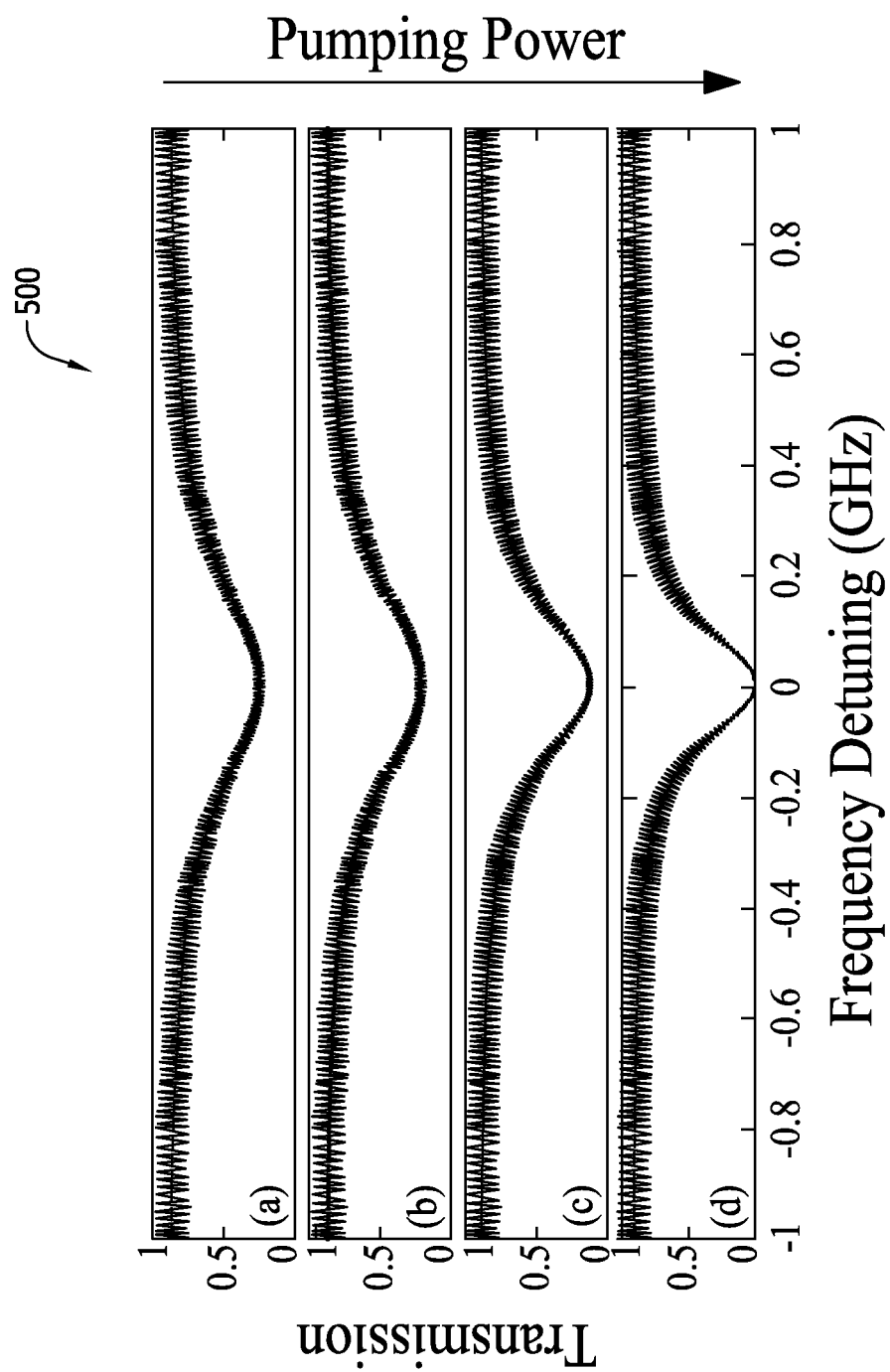
FIG. 5 is a graph plotting experimental data showing the change in transmission as a function of the pump power.

Further, as shown in graph 500 of FIG. 5, increasing the pumping power also increases the Q factor of ADF 100 and decreases the bandwidth, allowing for finer frequency selectivity when adding and dropping optical signals. For example, in some embodiments, by increasing the pump power, the intrinsic Q factor may increase from its initial value of $5.4 \times 10^6$ to $1.1 \times 10^8$, resulting a bandwidth increase from 38.7 MHz to 72 MHz. Further, as shown by the bottom curve on graph 500, at a sufficiently high pumping power, ADF 100 will be critically coupled such that all optical signals input into ADF 100 are coupled into resonator 102, substantially eliminating any crosstalk.

Although in some embodiments, gain is provided by optically pumping a gain medium, alternatively, alternatively ADF 100 may provide other types of gain. For example, ADF 100 may utilize Raman gain, parametric gain, gain generated using quantum dots, gain provided by material properties of resonator 102, etc. Further, in some embodiments, ADF 100 may be fabricated from semiconductor materials and electrical pumping may be utilized to provide gain.

Further, although the illustrated embodiments show a single resonator 102, in some embodiments, ADF 100 and/or system 300 includes a plurality of resonators 102. For example, ADF 100 may include an array of resonators 102 and optical waveguides 104 and 106 in some embodiments.

In at least some of the embodiments described herein, controlling the optical gain in a WGM resonator-based ADF can be utilized to increase add-drop efficiency and bandwidth, and reduce crosstalk. The ability to tune the optical gain by the pump power also provides tunability. This concept can be used in other types of ADFs based on WGM structures such as microrings, microtoroids, or any other optical resonator with a circular cross-section, as well as photonic crystal structures doped with appropriate gain media.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

In view of the above, it will be seen that the several advantages of the disclosure are achieved and other advantageous results attained. As various changes could be made in the above processes and composites without departing from the scope of the disclosure, it is intended that all matter contained in the above description and shown in the accompanying drawings shall be interpreted as illustrative and not in a limiting sense.

When introducing elements of the present disclosure or the various versions, embodiment(s) or aspects thereof, the articles "a", "an", "the" and "said" are intended to mean that there are one or more of the elements. It is also noted that the terms "comprising", "including", "having" or "containing" are intended to be open and permits the inclusion of additional elements or steps.

All of the compositions and/or methods disclosed and claimed herein may be made and/or executed without undue experimentation in light of the present disclosure. While the compositions and methods of this disclosure have been described in terms of the embodiments included herein, it will be apparent to those of ordinary skill in the art that variations may be applied to the compositions and/or methods and in the steps or in the sequence of steps of the method described herein without departing from the concept, spirit, and scope of the disclosure. All such similar substitutes and modifications apparent to those skilled in the art are deemed to be within the spirit, scope, and concept of the disclosure as defined by the appended claims.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although preferred embodiments of the present disclosure have been described in detail, it will be understood by those skilled in the art that various modifications can be made therein without departing from the spirit and scope of the disclosure as set forth in the appended claims.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An add-drop filter for transmitting at least one signal, the add-drop filter comprising:
    at least two optical waveguides capable of carrying the at least one signal; and
    at least one active resonator coupled between the optical waveguides,
    wherein the at least one active resonator having an optical gain medium configured with properties that provide an optical gain that counteract losses between the at least one active resonator and the at least two optical waveguides for the at least one signal and whereby an add efficiency and a drop efficiency are equal to one.

2. The add-drop filter according to claim 1, wherein the at least two optical waveguides are tapered optical fibers and the at least one active resonator is doped or co-doped with one or more optically active gain mediums at concentrations to provide one or more desired gains at one or more chosen spectral bands.

3. The add-drop filter according to claim 1, wherein the at least one active resonator is one of a microsphere, a ring, a capillary, a bubble, a disk, and a microtoroid.

4. The add-drop filter according to claim 1, wherein the at least one active resonator comprises a plurality of resonators.

5. The add-drop filter according to claim 1, further comprising a packaging that encloses and facilitates protecting the at least two optical waveguides and the at least one active resonator.

6. The add-drop filter according to claim 1, wherein to provide gain, the at least one active resonator is doped with rare-earth ions that emit light in response to absorbing a gain stimulation signal.

7. The add-drop filter according to claim 6, wherein the rare-earth ions include one or more of Erbium ions and Ytterbium ions.

8. The add-drop filter according to claim 6, wherein the at least one active resonator is doped using at least one of a dip coating method, an ion implantation method, and a direct fabrication method wherein the at least one active resonator is fabricated from a sol-gel material including gain dopants.

9. The add-drop filter according to claim 1, wherein the at least one active resonator provides at least one of Raman gain and parametric gain.

10. The add-drop filter according to claim 1, wherein a first optical waveguide of the at least two optical waveguides comprises an input port and a through port, and wherein a second optical waveguide of the at least two optical waveguides comprises an add port and a drop port.

11. An optical communication system comprising:
    an add-drop filter for transmitting at least one signal;
    the add-drop filter including at least two optical waveguides capable of carrying the at least one signal;
    at least one active resonator coupled between the optical waveguides, wherein the at least one active resonator having an optical gain medium configured with properties that provide an optical gain that counteract losses between the at least one active resonator and the at least two optical waveguides for the at least one signal and whereby an add efficiency and a drop efficiency are equal to one;
    a gain stimulation device coupled to the add-drop filter; and
    the gain stimulation device configured to provide a gain stimulation signal that excites the optical gain medium of the at least one active resonator.

12. The optical communication system according to claim 11, wherein the gain stimulation device comprises a pump laser and the gain medium comprises rare-earth ions.

13. The optical communication system according to claim 11, further comprising a controller communicatively coupled to the gain stimulation device and configured to tune the gain stimulation device.

14. The optical communication system according to claim 11, wherein the at least two optical waveguides are tapered optical fibers.

15. The optical communication system according to claim 11, wherein the at least one active resonator is one of a microsphere, a ring, a capillary, a bubble, a disk, and a microtoroid.

16. The optical communication system according to claim 11, wherein the at least one active resonator comprises a plurality of resonators.

17. A method of transmitting at least one signal through an add-drop filter, the method comprising:
    directing the at least one signal into the add-drop filter, wherein the add-drop filter includes at least two optical waveguides, and at least one active resonator coupled between the optical waveguides; and
    providing, using the at least one active resonator, gain that counteracts losses for the at least one signal as the at least one signal is transmitted through the add-drop filter, where the at least one active resonator having an optical gain medium configured with properties that provide an optical whereby an add efficiency and a drop efficiency are equal to one.

18. The method of claim 17, wherein providing gain comprises: including a gain medium on the at least one active resonator; and exciting the gain medium with a gain stimulation signal.

19. The method of claim 18, wherein including a gain medium on the at least one active resonator comprises doping the at least one active resonator with rare-earth ions.

20. The method of claim 18, wherein exciting the gain medium with a gain stimulation signal comprises transmitting the gain stimulation signal from a pump laser that is optically coupled to the add-drop filter.

* * * * *